US011223553B1

(12) United States Patent
Shcherbakov

(10) Patent No.: US 11,223,553 B1
(45) Date of Patent: Jan. 11, 2022

(54) TECHNIQUES FOR ROUTING MESSAGES THROUGH A MESSAGE DELIVERY NETWORK

(71) Applicant: Bandwidth, Inc., Raleigh, NC (US)

(72) Inventor: Roman Shcherbakov, Chapel Hill, NC (US)

(73) Assignee: Bandwidth, Inc., Raleigh, NC (US)

( * ) Notice: Subject to any disclaimer, the term of this patent is extended or adjusted under 35 U.S.C. 154(b) by 0 days.

(21) Appl. No.: 17/386,730

(22) Filed: Jul. 28, 2021

(51) Int. Cl.
*H04L 12/721* (2013.01)
*H04W 40/26* (2009.01)
*H04W 4/14* (2009.01)
*H04L 12/703* (2013.01)

(52) U.S. Cl.
CPC ............ *H04L 45/124* (2013.01); *H04L 45/14* (2013.01); *H04L 45/28* (2013.01); *H04W 4/14* (2013.01); *H04W 40/26* (2013.01)

(58) Field of Classification Search
CPC . H04L 12/66; H04L 41/0823; H04L 41/0826; H04L 41/14; H04L 41/145; H04L 45/00; H04L 45/22; H04L 45/24; H04W 4/14; H04W 88/184
See application file for complete search history.

(56) References Cited

U.S. PATENT DOCUMENTS

| | | | |
|---|---|---|---|
| 2004/0170181 A1* | 9/2004 | Bogdon | H04L 12/5692 370/400 |
| 2010/0091681 A1* | 4/2010 | Sonoda | H04L 45/54 370/252 |
| 2011/0134924 A1* | 6/2011 | Hewson | H04L 12/4625 370/392 |
| 2014/0269305 A1* | 9/2014 | Nguyen | H04L 47/00 370/235 |
| 2016/0226751 A1* | 8/2016 | Yamana | H04L 43/0823 |

* cited by examiner

*Primary Examiner* — Kan Yuen
(74) *Attorney, Agent, or Firm* — Gregory Stephens

(57) ABSTRACT

Disclosed are techniques for routing messages from a message delivery network (MDN) to one of a plurality of end user carriers, wherein there are a plurality of message routes capable of servicing each end user carrier. An MDN may receive a message from a sending message service provider. The MDN may identify a destination end user carrier servicing the end user device for the message. The MDN may produce a rank ordered list of message routes from the MDN to the destination end user carrier by solving a linear constrained optimization model configured to converge upon an optimized ranking of message routes from the MDN to the plurality of end user carriers. The MDN may then attach the rank ordered list of message routes to the message before forwarding the message to a gateway within the MDN. The gateway may then initially attempt delivery of the message using the highest ranked message route from the rank ordered list of message routes. If the delivery attempt fails, the next highest ranked message route may be attempted until the message is delivered or no other message routes are available to try. Other embodiments are described herein.

30 Claims, 12 Drawing Sheets

100

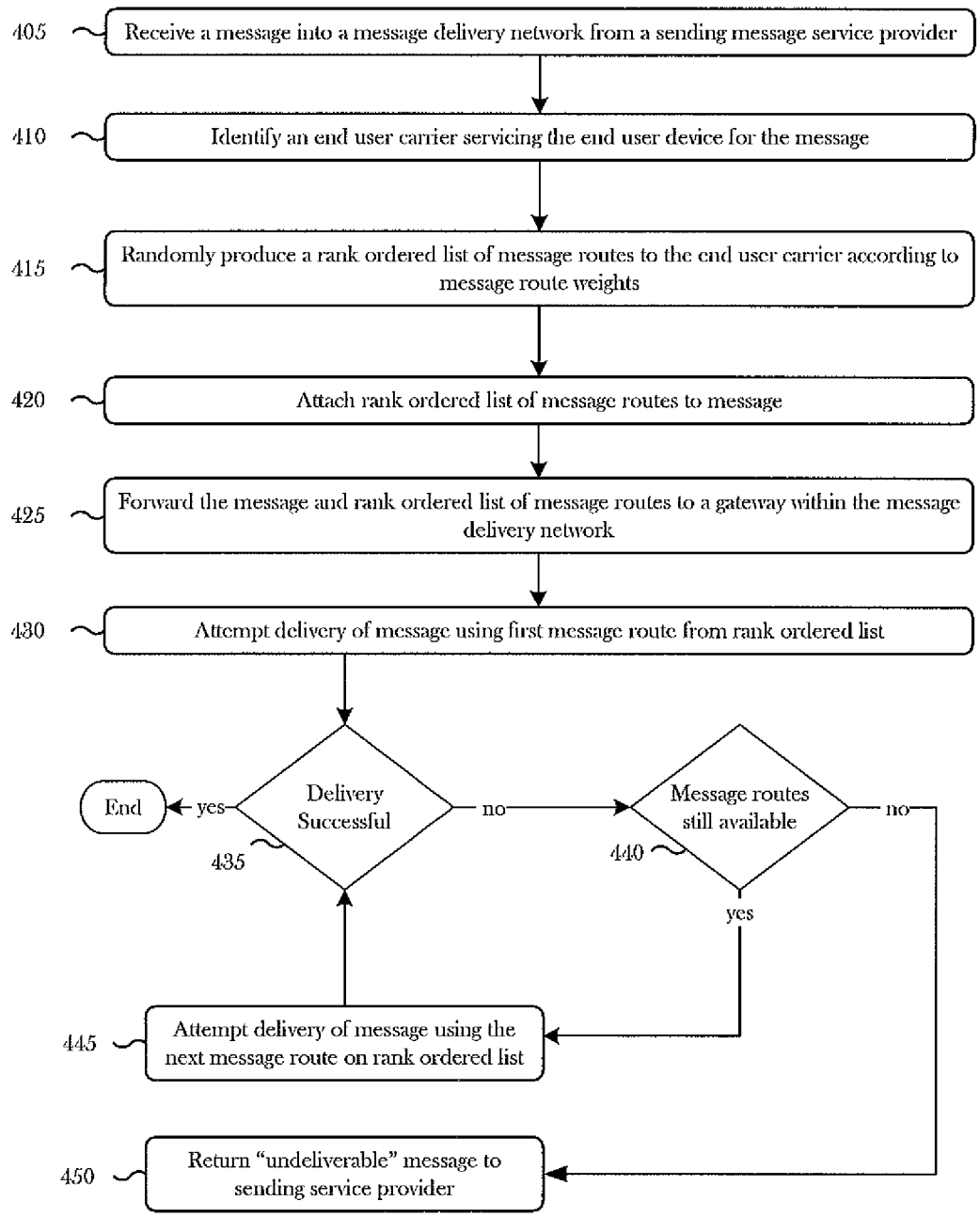

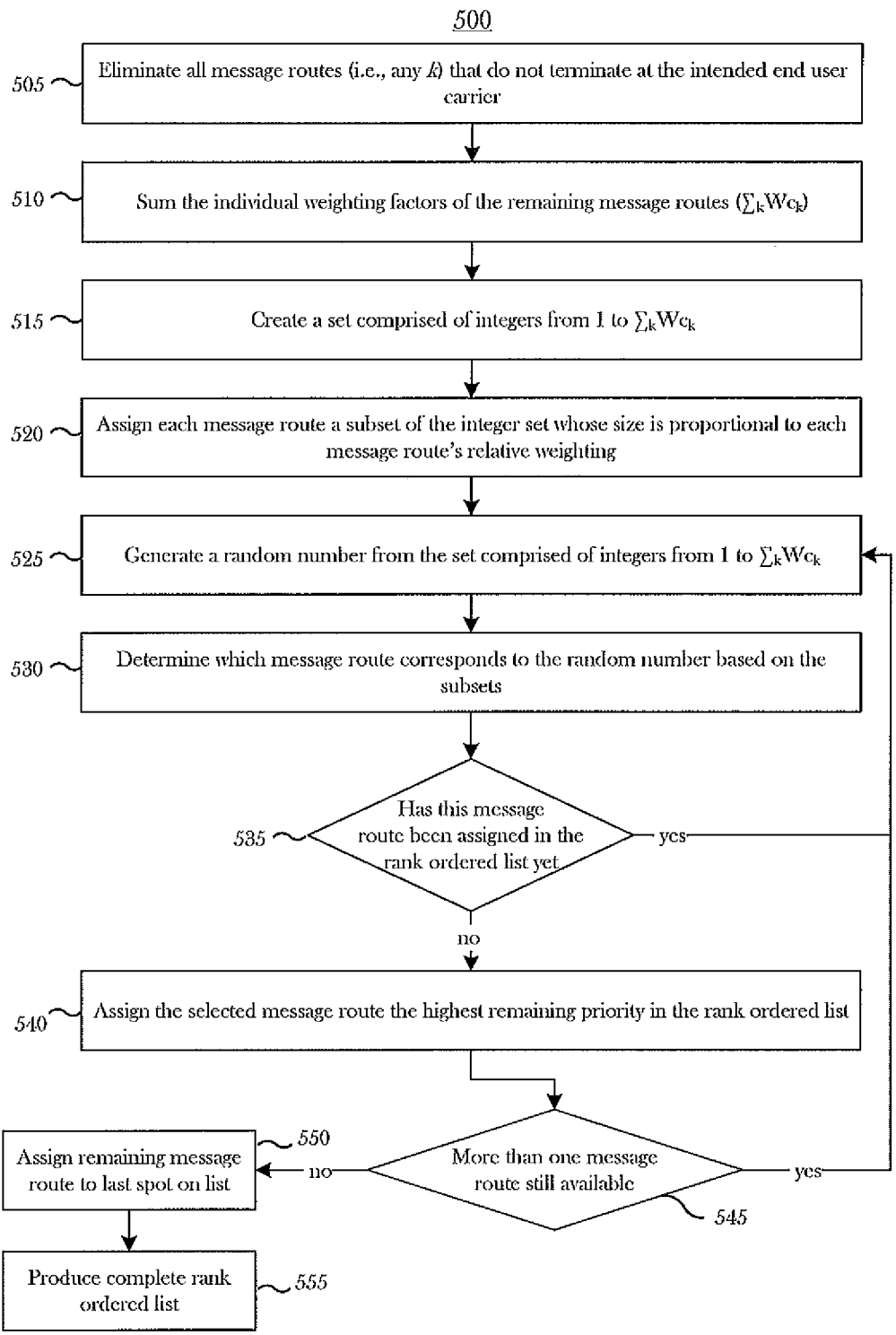

FIG. 6A

| 602a | 604a | 606a | 608a | 610a | 612a | 614a | 616a |
|---|---|---|---|---|---|---|---|
| Message Routes (MR$_k$) where k = 1 to n (n=20) | Initial Message Route Weight (Wc$_k$) (Normalized) | MR base cost $ (.0001) | MR actual cost$_k$ ($) (.0001) | MR base failure rate (FR per thousand) | MR actual failure rate$_k$ (FR per thousand) | Destination Carrier | Message Weight Function Calculation F$_k$(Wc) |
| 1 | 50000 | 10 | 5.6 | 50 | 17 | A | 12.71 |
| 2 | 50000 | 10 | 8.5 | 50 | 22 | A | 28.19 |
| 3 | 50000 | 10 | 12 | 50 | 38 | A | 59.06 |
| 4 | 50000 | 10 | 11.3 | 50 | 39 | A | 53.82 |
| 5 | 50000 | 10 | 7.3 | 50 | 5 | A | 18.80 |
| 6 | 50000 | 10 | 8.2 | 50 | 7 | B | 23.83 |
| 7 | 50000 | 10 | 9.5 | 50 | 12 | B | 32.45 |
| 8 | 50000 | 10 | 13 | 50 | 42 | B | 69.73 |
| 9 | 50000 | 10 | 11.3 | 50 | 44 | B | 56.31 |
| 10 | 50000 | 10 | 7.4 | 50 | 19 | B | 21.33 |
| 11 | 50000 | 10 | 10.7 | 50 | 46 | C | 52.77 |
| 12 | 50000 | 10 | 9.2 | 50 | 44 | C | 41.24 |
| 13 | 50000 | 10 | 8.7 | 50 | 7 | C | 26.79 |
| 14 | 50000 | 10 | 8.2 | 50 | 16 | C | 25.07 |
| 15 | 50000 | 10 | 12.8 | 50 | 25 | C | 61.09 |
| 16 | 50000 | 10 | 13.4 | 50 | 46 | D | 75.54 |
| 17 | 50000 | 10 | 9.4 | 50 | 37 | D | 39.14 |
| 18 | 50000 | 10 | 8.8 | 50 | 28 | D | 31.81 |
| 19 | 50000 | 10 | 6.7 | 50 | 15 | D | 17.06 |
| 20 | 50000 | 10 | 10 | 50 | 20 | D | 37.40 |
| Sum of Message Route Weights (Normalized) | 1000000 ~ 620 | | | | Sum of Weighted Message Route Functions | | 784.15 ~ 625 |

0.7    0.3

* Optimized for 70% cost and 30% failure rate ~ 630

FIG. 6B

| 602b | 604b | 606b | 608b | 610b | 612b | 614b | 616b |
|---|---|---|---|---|---|---|---|
| Message Routes ($MR_k$) where k = 1 to n (n=20) | Current Message Route Weight ($Wc_k$) (Normalized) | MR base cost $ (.0001) | MR actual cost$_k$ ($) (.0001) | MR base failure rate (FR per thousand) | MR actual failure rate$_k$ (FR per thousand) | Destination Carrier | Message Weight Function Calculation $F_k(Wc)$ |
| 1 | 52300 | 10 | 5.6 | 50 | 17 | A | 13.29 |
| 2 | 51200 | 10 | 8.5 | 50 | 22 | A | 28.87 |
| 3 | 48000 | 10 | 12 | 50 | 38 | A | 56.70 |
| 4 | 50850 | 10 | 11.3 | 50 | 39 | A | 54.73 |
| 5 | 52500 | 10 | 7.3 | 50 | 5 | A | 19.74 |
| 6 | 50000 | 10 | 8.2 | 50 | 7 | B | 23.83 |
| 7 | 50000 | 10 | 9.5 | 50 | 12 | B | 32.45 |
| 8 | 47220 | 10 | 13 | 50 | 42 | B | 65.86 |
| 9 | 47800 | 10 | 11.3 | 50 | 44 | B | 53.83 |
| 10 | 50000 | 10 | 7.4 | 50 | 19 | B | 21.33 |
| 11 | 49740 | 10 | 10.7 | 50 | 46 | C | 52.49 |
| 12 | 50150 | 10 | 9.2 | 50 | 44 | C | 41.36 |
| 13 | 51000 | 10 | 8.7 | 50 | 7 | C | 27.32 |
| 14 | 51000 | 10 | 8.2 | 50 | 16 | C | 25.57 |
| 15 | 50300 | 10 | 12.8 | 50 | 25 | C | 61.46 |
| 16 | 46000 | 10 | 13.4 | 50 | 46 | D | 69.50 |
| 17 | 50090 | 10 | 9.4 | 50 | 37 | D | 39.21 |
| 18 | 50900 | 10 | 8.8 | 50 | 28 | D | 32.38 |
| 19 | 50950 | 10 | 6.7 | 50 | 15 | D | 17.39 |
| 20 | 50000 | 10 | 10 | 50 | 20 | D | 37.40 |
| Sum of Message Route Weights (Normalized) | 1000000 ~ 620 | | | | Sum of Weighted Message Route Functions | | 774.72 ~ 625 |
| 0.7 | 0.3 | | | | | | |

\* Optimized for 70% cost and 30% failure rate ~ 630

FIG. 6C

| 602c | 604c | 606c | 608c | 610c | 612c | 614c | 616c |
|---|---|---|---|---|---|---|---|
| Message Routes ($MR_k$) where k = 1 to n (n=20) | Current Message Route Weight ($Wc_k$) (Normalized) | MR base cost $ (.0001) | MR actual $cost_k$ ($) (.0001) | MR base failure rate (FR per thousand) | MR actual $rate_k$ (FR per thousand) | Destination Carrier | Message Weight Function Calculation $F_k(Wc)$ |
| 1 | 53300 | 10 | 5.6 | 50 | 17 | A | 13.55 |
| 2 | 52200 | 10 | 8.5 | 50 | 22 | A | 29.43 |
| 3 | 47000 | 10 | 12 | 50 | 38 | A | 55.52 |
| 4 | 51850 | 10 | 11.3 | 50 | 39 | A | 55.81 |
| 5 | 53500 | 10 | 7.3 | 50 | 5 | A | 20.12 |
| 6 | 49000 | 10 | 8.2 | 50 | 7 | B | 23.35 |
| 7 | 49000 | 10 | 9.5 | 50 | 12 | B | 31.80 |
| 8 | 46220 | 10 | 13 | 50 | 42 | B | 64.46 |
| 9 | 46800 | 10 | 11.3 | 50 | 44 | B | 52.70 |
| 10 | 51000 | 10 | 7.4 | 50 | 19 | B | 21.76 |
| 11 | 48740 | 10 | 10.7 | 50 | 46 | C | 51.44 |
| 12 | 49150 | 10 | 9.2 | 50 | 44 | C | 40.54 |
| 13 | 52000 | 10 | 8.7 | 50 | 7 | C | 27.86 |
| 14 | 52000 | 10 | 8.2 | 50 | 16 | C | 26.07 |
| 15 | 51300 | 10 | 12.8 | 50 | 25 | C | 62.68 |
| 16 | 45000 | 10 | 13.4 | 50 | 46 | D | 67.99 |
| 17 | 48990 | 10 | 9.4 | 50 | 37 | D | 38.35 |
| 18 | 52000 | 10 | 8.8 | 50 | 28 | D | 33.08 |
| 19 | 52950 | 10 | 6.7 | 50 | 15 | D | 18.07 |
| 20 | 48000 | 10 | 10 | 50 | 20 | D | 35.90 |
| Sum of Message Route Weights (Normalized) | 1000000 ~ 620 | | | | Sum of Weighted Message Route Functions | | 770.48 ~ 625 |

0.7      0.3

* Optimized for 70% cost and 30% failure rate ~ 630

FIG. 6D

| 602d | 604d | 606d | 608d | 610d | 612d | 614d | 616d |
|---|---|---|---|---|---|---|---|
| Message Routes ($MR_k$) where k = 1 to n (n=20) | Current Message Route Weight ($Wc_k$) (Normalized) | MR base cost $ (.0001) | MR actual $cost_k$ ($) (.0001) | MR base failure rate (FR per thousand) | MR actual failure $rate_k$ (FR per thousand) | Destination Carrier | Message Weight Function Calculation $F_k(Wc)$ |
| 1 | 120000 | 10 | 5.6 | 50 | 17 | A | 30.50 |
| 2 | 50000 | 10 | 8.5 | 50 | 22 | A | 28.19 |
| 3 | 4000 | 10 | 12 | 50 | 38 | A | 4.73 |
| 4 | 20000 | 10 | 11.3 | 50 | 39 | A | 21.53 |
| 5 | 82000 | 10 | 7.3 | 50 | 5 | A | 30.83 |
| 6 | 80000 | 10 | 8.2 | 50 | 7 | B | 38.12 |
| 7 | 42000 | 10 | 9.5 | 50 | 12 | B | 27.26 |
| 8 | 2000 | 10 | 13 | 50 | 42 | B | 2.79 |
| 9 | 12000 | 10 | 11.3 | 50 | 44 | B | 13.51 |
| 10 | 111000 | 10 | 7.4 | 50 | 19 | B | 47.36 |
| 11 | 22000 | 10 | 10.7 | 50 | 46 | C | 23.22 |
| 12 | 45000 | 10 | 9.2 | 50 | 44 | C | 37.12 |
| 13 | 63000 | 10 | 8.7 | 50 | 7 | C | 33.75 |
| 14 | 87000 | 10 | 8.2 | 50 | 16 | C | 43.62 |
| 15 | 2000 | 10 | 12.8 | 50 | 25 | C | 2.44 |
| 16 | 4000 | 10 | 13.4 | 50 | 46 | D | 6.04 |
| 17 | 24000 | 10 | 9.4 | 50 | 37 | D | 18.79 |
| 18 | 71000 | 10 | 8.8 | 50 | 28 | D | 45.17 |
| 19 | 105000 | 10 | 6.7 | 50 | 15 | D | 35.83 |
| 20 | 54000 | 10 | 10 | 50 | 20 | D | 40.39 |

Sum of Message Route Weights (Normalized) 1000000 ～ 620

Sum of Weighted Message Route Functions 531.19 ～ 625

0.7     0.3

* Optimized for 70% cost and 30% failure rate ～ 630

FIG. 7

| Message Route (k) [702] | Destination Carrier [704] | Final Message Route Weight ($Wc_k$) (Normalized) [706] | Message Route Rankings (by percentage and destination) [708] |
|---|---|---|---|
| 1 | A | 120000 | 43 |
| 2 | A | 50000 | 18 |
| 3 | A | 4000 | 1 |
| 4 | A | 20000 | 7 |
| 5 | A | 82000 | 30 |
| 6 | B | 80000 | 32 |
| 7 | B | 42000 | 17 |
| 8 | B | 2000 | 1 |
| 9 | B | 12000 | 5 |
| 10 | B | 111000 | 45 |
| 11 | C | 22000 | 10 |
| 12 | C | 45000 | 21 |
| 13 | C | 63000 | 29 |
| 14 | C | 87000 | 40 |
| 15 | C | 2000 | 1 |
| 16 | D | 4000 | 2 |
| 17 | D | 24000 | 9 |
| 18 | D | 71000 | 28 |
| 19 | D | 105000 | 41 |
| 20 | D | 54000 | 21 |

US 11,223,553 B1

TECHNIQUES FOR ROUTING MESSAGES THROUGH A MESSAGE DELIVERY NETWORK

TECHNICAL FIELD

Examples described herein are generally related to techniques for routing messages through a message delivery network (MDN) from a sending messaging service provider to an end user carrier servicing a destination device of an end user.

BACKGROUND

An MDN may receive a message from an external sending service provider that is intended for an external message recipient. There may be multiple message routes available to the MDN to deliver the message to the end user. Each message route may have pros and cons to it. For instance, some message routes may be more costly to use than others. Some message routes may be more reliable with respect to deliverability of the message than others. Some message routes may be temporarily experiencing network issues that impact the ability of the message to be delivered. However, MDNs do not often prioritize message routes when delivering messages. This may lead to cost inefficiencies and poor delivery rates especially if the MDN continuously attempts delivery over a message route that is currently experiencing technical difficulties. What is needed are systems and methods for determining the optimal message routes to use in delivering a message.

SUMMARY

According to some implementations, a method of routing messages from an MDN to one of a plurality of end user carriers, wherein there is a plurality of message routes capable of servicing each end user carrier. An MDN may receive a message from a sending message service provider. The MDN may identify a destination end user carrier servicing the end user device for the message. The MDN may produce a rank ordered list of message routes from the MDN to the destination end user carrier by solving a linear constrained optimization model configured to converge upon an optimized ranking of message routes from the MDN to the plurality of end user carriers. The MDN may then attach the rank ordered list of message routes to the message before forwarding the message to a gateway within the MDN. The gateway may then initially attempt delivery of the message using the highest ranked message route from the rank ordered list of message routes.

According to some implementations, the method routing messages through a message delivery network may further include determining whether the message delivery was successful based on an acknowledgment notification returned to the MDN. When the message delivery was not successful, the MDN may determine whether all the message routes on the rank ordered list have been attempted. When all the message routes on the rank ordered list have not been attempted, the MDN may attempt delivery of the message using the next highest ranked message route. When all the message routes on the rank ordered list have been attempted, the MDN may return an "undeliverable" notification to the sending message service provider.

According to some implementations, creating the linear constrained optimization model may include having the MDN determine all possible message routes from the MDN to the end user carriers. The MDN may then assign a base cost indicative of a threshold cost for delivering a message to the plurality of end user carriers over any given message route and determine an actual cost to use each message route. The MDN may then assign a base failure rate (FR) indicative of a threshold FR for any given message route and determine an actual FR associated with each message route. The MDN may then define one or more constraints applicable to delivery of messages by the MDN. The MDN may then determine a message route weight function ($F_k$(Wc)) (where k=1 . . . n and n is the total number of message routes) based on a message route weight ($Wc_k$), a base cost, a base FR, an actual cost$_k$, an actual FR$_k$, and the one or more constraints. In addition, the MDN may obtain a sample set of message data on which to solve the linear constrained optimization model.

According to some implementations, solving the linear constrained optimization model may include assigning an initial normalized weight ($Wc_k$) to each message route (i.e., k=1 to n). The weights may be normalized such that the sum of the weights ($\Sigma_k Wc_k$) always equals a designated value (e.g., 1,000,000) and the individual weights are rounded to the nearest integer. The MDN may then determine whether the $Wc_k$ vector satisfies the one or more constraints and if the $Wc_k$ vector does not satisfy the one or more constraints, the MDN may introduce small random adjustments to each $Wc_k$ until the $Wc_k$ vector does satisfy the one or more constraints. The MDN may then compute a message route weight function value ($F_k$(Wc)) for each message route (i.e., k=1 . . . n) using the sample set of message data. The MDN may then calculate the sum of the message route weight function values (i.e., $\Sigma_k F_k$(Wc)).

The MDN may then introduce small random adjustments to each $Wc_k$ in the vector to yield a new vector of message route weights ($Wn_k$). The MDN may then determine whether the $Wn_k$ vector satisfies the one or more constraints, and if the $Wn_k$ vector does not satisfy the one or more constraints, the MDN may introduce small random adjustments to each $Wn_k$ in the vector until the $Wn_k$ vector does satisfy the one or more constraints. The MDN may then determine the value of each new message route weight function $F_k$(Wn) for each message route using the sample set of message data and calculate the sum ($\Sigma_k F_k$(Wn)). The MDN may then determine if $\Sigma_k F_k$(Wn) is less than $\Sigma_k F_k$(Wc), and when $\Sigma_k F_k$(Wn) is less than $\Sigma_k F_k$(Wc), the MDN may set $Wc_k$=$Wn_k$, otherwise the MDN may leave $Wc_k$ unchanged. The MDN may then determine whether $\Sigma_k F_k$(Wc) has converged to a minimum value, and when $\Sigma_k F_k$(Wc) has converged to a minimum value, the MDN may store the $Wc_k$ vector as the final message route weights. When $\Sigma_k F_k$(Wc) has not converged to a minimum value, the MDN may make repeat the process from the step of introducing small random adjustments to each $Wc_k$ to yield another new vector of message route weights ($Wn_k$). In one implementation, $\Sigma_k Wc_k$ may be chosen to be the same value for each iteration through a normalization process. In addition, the value of each weight $Wc_k$ may be rounded to the nearest integer.

According to some implementations, producing a rank ordered list of message routes from the message delivery network to the destination end user carrier may include retrieving the stored message route weights ($Wc_k$) of all message routes. The MDN may then eliminate message routes that do not terminate at the destination end user carrier and sum the remaining $Wc_k$ for message routes that terminate at the destination end user carrier yielding $\Sigma_k Wc_k$ (only for message routes (i.e., k) that terminate at the destination end user carrier). The MDN may then create an integer set comprised of 1 to $\Sigma_k Wc_k$. The MDN may then assign each remaining message route that terminates at the destination end user carrier to a subset of the integer set where the subset size is proportional to each message route's weight (i.e., $Wc_k/\Sigma_k Wc_k$). The MDN may then generate a random number from the integer set and determine which message route has been assigned to the generated random number. The MDN may then determine if the message route associated with the generated random number has already been assigned within the rank ordered list. When the message route associated with the generated random number has already been assigned within the rank ordered list, the process repeats from the step of generating a random number from the integer set. Otherwise, the MDN may assign the message route associated with the generated random number to the highest remaining priority in the rank ordered list. The MDN may then determine whether more than one message route remains unassigned in the rank ordered list. When more than one message route remains unassigned in the rank ordered list, the process again repeats from the step of generating a random number from the integer set. Otherwise, the MDN may assign the last remaining message route to the last spot in the rank ordered list and produce the rank ordered list of message routes from the message delivery network to the destination end user carrier for the message to be delivered.

According to some implementations, the method for routing messages through a message delivery network may further include constructing the message weight function ($F_k(Wc)$) to include a cost component plus an FR component. The cost component may be based on a ratio between the actual cost and base cost and the FR component may be based on a ratio between the actual FR and the base FR. In addition, a cost weighting factor ($wf_c$) between 0 and 1 may be applied to the cost component of $F_k(Wc)$ and an FR weighting factor ($wf_{fr}$) between 0 and 1 may be applied to the FR component of $F_k(Wc)$, wherein $wf_c + wf_{fr} = 1$.

According to some implementations, the message may comprise a short message service (SMS) message or a multi-media service (MMS) message.

BRIEF DESCRIPTION OF THE DRAWINGS

FIG. 4 illustrates a third logic flow diagram for sending a message based on the results of solving the linear constrained optimization model according to an embodiment.

FIG. 5 illustrates a fourth logic flow diagram for randomly producing a rank ordered list of message routes based on the results of solving the linear constrained optimization model according to an embodiment.

FIG. 6A illustrates an example of initial message route weighting results calculated after solving an iteration of the linear constrained optimization model according to an embodiment.

FIG. 6B illustrates a first example of amended message route weighting results calculated after solving an iteration of the linear constrained optimization model according to an embodiment.

FIG. 6C illustrates a second example of amended message route weighting results calculated after solving an iteration of the linear constrained optimization model according to an embodiment.

FIG. 6D illustrates a final converged example of amended message route weighting results calculated after solving an iteration of the linear constrained optimization model according to an embodiment.

FIG. 7 illustrates an example of the final ranked results upon solving the linear constrained optimization model according to an embodiment.

DETAILED DESCRIPTION

Figure 1:
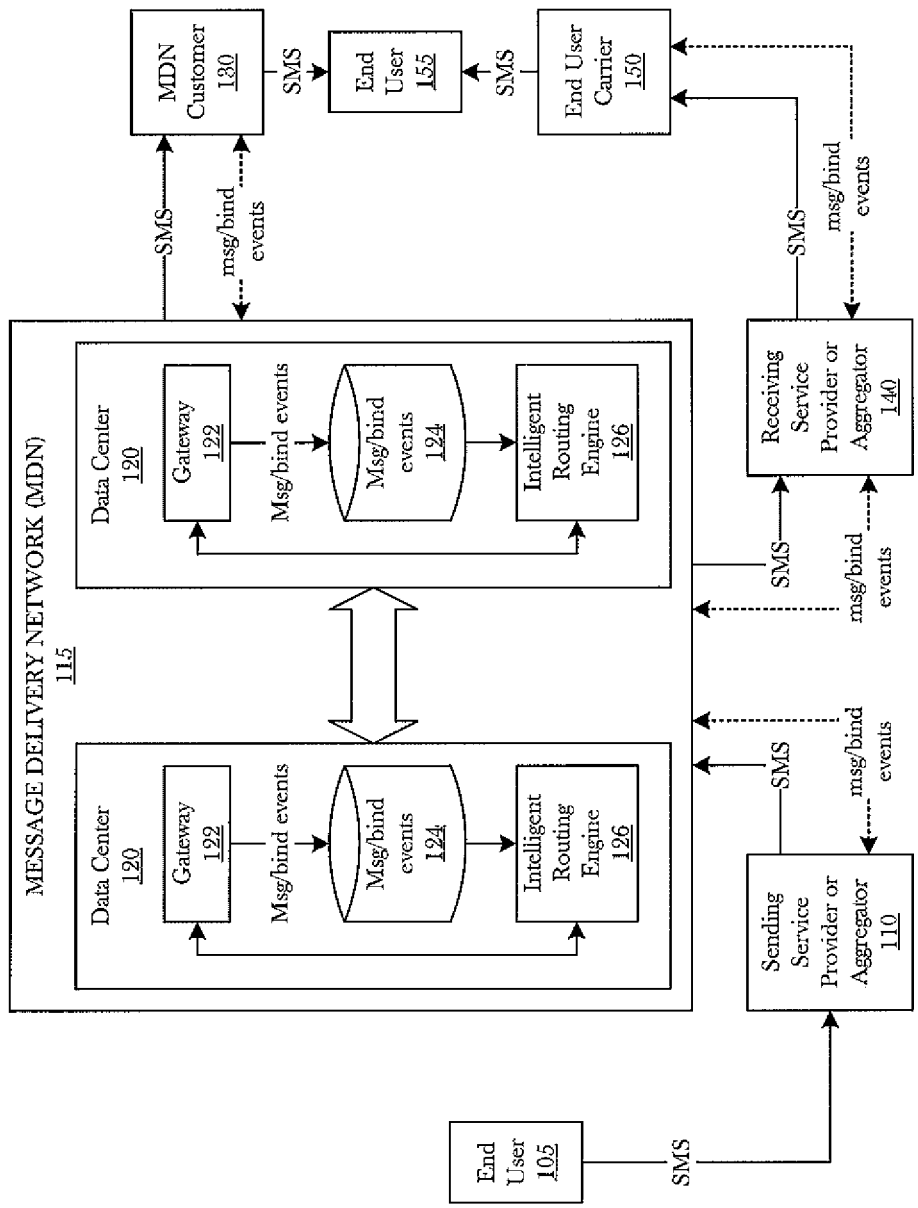
FIG. 1 illustrates an example network architecture according to an embodiment.

Various embodiments may include systems, methods, apparatuses, and techniques to route messages through a message delivery network from a sending messaging service provider to an end user carrier servicing a destination device of an end user.

In some embodiments, a message delivery network may be comprised of one or more data centers each operable to receive and route a message. The messages may be short message service (SMS) messages, multi-media message service (MMS) messages, or other data or text based messages, notifications, alerts, or the like. Each data center may include, among other components, a gateway for receiving messages from an external node/entity and sending messages to an external node/entity, a database of message and bind events, and an intelligent routing engine. It is noted the message delivery network is only a portion of path traversed from message sending device to message receiving device.

In the embodiments described herein, the message delivery network may receive a message from an external sending service provider that is intended for an external message recipient. There may be multiple message routes available to the message delivery network to deliver the message to the end user. Each message route may have pros and cons to it. For instance, some message routes may be more costly to use than others. Some message routes may be more reliable with respect to deliverability of the message than others. Some message routes may be temporarily experiencing network issues that impact the ability of the message to be delivered.

An intelligent routing engine may determine all possible message routes that may be utilized to deliver the message to an end user carrier. The intelligent routing engine may further set up and solve a linear constrained optimization model designed to select and rank message routes from the message delivery network to end user carriers. The linear constrained optimization model applies a set of weights for each message route. The weights may be associated with different characteristics of the message route such as, for instance, the cost to send a message using the message route and the reliability of the message route. There may be one or more constraints placed upon the cost and reliability characteristics that are used in the linear constrained optimization model that determine the weights. When a message is received into a gateway within the message delivery network it may be parsed to determine the end user carrier (i.e., the carrier that services the destination end user device). This may be followed by a randomized route selection process based on the output of the linear constrained optimization process.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates an example network architecture 100 according to an embodiment. Following the flow of a message, a sending end user device 105 creates and sends a message intended for a second end user device 155. For example, the message may be an SMS or MMS message or other message like a notification, alert, or other text/data based message. The end user device 105 may be a mobile phone owned by a subscriber to a mobile phone carrier network. In other embodiments, the end user device 105 may be a computer of a business entity, the business entity receiving services from a messaging service provider. The business entity may utilize what has been termed application-to-person (A2P) messaging. A2P messaging generally refers to SMS/MMS messages generated and sent by a machine as opposed to a person. Common examples may include appointment reminders from doctor's offices, or status notifications of technicians on their way to a customer's house.

Either way, the message is transmitted from the end user device 105 to a sending service provider or aggregator 110. The sending service provider 110 may be a mobile phone carrier network in the case of a mobile phone subscriber end user. In other embodiments, the sending service provider 110 may be a customer of the message delivery network (MDN) 115 owner in the case of A2P messaging. In the case of an aggregator 110, the aggregator 110 may be an entity that acts as message broker that serves to receive and forward messages between carriers and/or message service providers.

The message may then be presented to MDN 115 from either a sending service provider 110 or an aggregator 110 where it may be received by a data center 120. More specifically, the message may be received by a gateway 122 within a data center 120. It should be noted that MDN 115 may comprise multiple data centers 120 each with multiple gateways 122 for geographical efficiency, load balancing, and/or redundancy purposes. The gateway 122 may then forward the message to an intelligent routing engine 126. The intelligent routing engine 126 may then use the message data, such as "to" and "from" telephone numbers in the message to determine its destination—specifically an end user carrier 150 destination. In some embodiments, there may not be an end user carrier 150 because the message may be intended for an end user device 155 that is the customer of a direct customer of the MDN 115 referred to in FIG. 1 as an MDN customer 130. Knowing the end user destination allows the intelligent routing engine 126 to build or access an already determined list of message routes from MDN 115 to the end user carrier 150. The development and prioritization of the message routes may be a complex process based on multiple factors that are both static and dynamic in nature.

When the end user device 155 is serviced by an MDN customer 130, the MDN 115 will route the message directly to the MDN customer 130 without having to use one or more receiving service providers or aggregators 140. When the end user device 155 is serviced by end user carrier 150, MDN 115 will route the message through one or more receiving service providers or aggregators 140. In these cases there are typically multiple message routes available for MDN 115 to use to deliver the message to the end user carrier 150. The intelligent routing engine 126 will compile a list of the potential message routes resulting from a process (e.g., linear constrained optimization) that ranks the message routes from most preferable to least preferable. A randomized process for selecting a rank ordered list of message routes for the message may be executed to determine which message routes will be prioritized for delivery of the current message.

The intelligent routing engine 126 may utilize multiple variables and associated constraints to set up and solve a linear constrained optimization model to determine the optimal route(s) for the message. The linear constrained optimization model may be solved against a set of messages indicative of typical message traffic. For instance, the sample set of messages may be generated or sampled from the production system of MDN 115. If the sample set of messages comes from the archives of a production model, the message metadata may be retained but message content is excluded as it is unnecessary to the problem at hand. The number of messages in the sample set may vary. The linear constrained optimization model may be solved using a sample message set of 1000 messages. Similarly, the linear constrained optimization model may be solved using a sample message set of 1,000,000 messages. By and large, the number of messages in the sample set may be considered a design choice. A larger sample of messages would allow for a more accurate representation of message traffic especially for rare message routes that may not occur that often. Ideally, a sample set would be obtained as close in time to when the constrained optimization model is calculated so as to better represent the current flow of message traffic.

Variables and constraints may include, but are not limited to, the actual cost to route the message over a particular message route, the recent historical reliability or failure rate (FR) of the message route, any finite capacity constraints (CC) associated with the hardware components along the route, and any contractual constraints to utilize a particular message route (CM). A constraint may be a limit placed on one or more variables. For instance, one example of a constraint may be that a message failure rate (FR) may not go above 5%. Another example of a constraint may be that all messages may not be sent along the same route due to a potential over burdening. Similarly, another constraint may be that the MDN 115 may have certain minimum commitments for certain aggregators or service providers that mandate payment whether the resources are used or not. In such cases, those message routes may have to be utilized somewhat to avoid paying for services and not utilizing them. Consequently, the weighting factors for such message routes may be adjusted accordingly.

Each message route may be assigned an initial weight once the weighting factors and associated constraints have been identified. The message route weights may be normalized to a chosen scale. This may be followed by a linear constrained optimization simulation on a realistic message data set to converge upon optimal weights for each message route based on the variables and constraints. The optimal weight may be, for instance, a normalized value between 1-1,000,000. This is a design choice not intended to limit the disclosure or scope of any claims herein. The linear constrained optimization model may be rerun frequently (e.g., once per minute) on the message data set to re-determine the optimal weights for each message route based on new inputs or changes to variables since the last time the model was run. For instance, the failure rate (FR) of some message routes may have changed. Even relatively static factors like cost may periodically get updated. Re-running the linear constrained optimization model periodically captures a fairly dynamic view of the MDN 115.

As described above, the linear constrained optimization model outputs and stores a weight in the form of an integer value for each message route. When a specific message is queued for delivery, the intelligent routing engine 126 will access the results of the most recently solved linear constrained optimization model to generate a rank ordered list of message routes.

This may entail determining the subset of message routes from all possible message routes that may be used to deliver this particular message. For instance, the message may be slated for delivery to a particular end user carrier 150. Only a subset of the total number of message routes serviced by MDN 115 may terminate at that particular end user carrier 150. Once the subset of message routes has been determined, the integer weight, as determined by the linear constrained optimization model, may be retrieved for each potential message route from the subset. The message routes may then be ranked according to their weights and a random draw may then determine an actual ordered list of message routes for that message. The random draw ensures the same rank ordered list is not used every time a new message is queued for delivery.

For example, consider a new message presented to the intelligent routing engine 126 for delivery. The intelligent routing engine 126 may access the most recent results of the linear constrained optimization model to determine that there are five distinct message routes capable of delivering the message. Each of these message routes may be associated with its own individual weight accessible to intelligent routing engine 126.

Intelligent routing engine 126 may then randomly construct a rank ordered list of message routes to be sent to gateway 122 along with the message to be sent. Gateway 122 may then attempt delivery using the highest ranked message route according to the rank ordered list. If that attempt fails, gateway 122 may attempt re-delivery of the message using the next highest ranked message route. This process may continue until there is successful delivery of the message or until all message routes have been exhausted without successful delivery of the message. In that case, a "delivery failure" notification is communicated to the sender.

A message event is indicative of an outcome as represented by a notification or acknowledgment issued in the due course of sending and receiving messages. For instance, a message accepted (msg_accepted) acknowledgment may be returned from an aggregator or receiving message service provider 140 each time a message is delivered to that aggregator or receiving message service provider 140. When the aggregator or receiving message service provider 140 returns the msg_accepted acknowledgment, the MDN 115 logs the event in the msg/bind event database 124 including a timestamp. The absence of a msg_accepted acknowledgment may also be logged the msg/bind event database 124 and associated with a particular message and timestamp. Similarly, a message delivery receipt (msg_delivery_rcpt) may be returned from an end user carrier 150 each time a message is delivered to that end user carrier 150. When the end user carrier 150 returns a message delivery receipt, the MDN 115 logs the event in the msg/bind event database 124 including a timestamp. The absence of a message delivery receipt may also be logged the msg/bind event database 124 and associated with a particular message and timestamp.

A bind event is indicative of the health of the connection between the MDN 115 and one or more links on the way to the end user carrier 150. Typically, a bind request is used to establish a connection with a receiving service provider or aggregator 140. Establishment of the bind may then be logged in the msg/bind event database 124. Once established, the bind should remain operable until an unbind request is executed or some other unexpected event terminates the bind. An enquire link request may be issued periodically to ensure the bind is still operable. This request (enquire_link) and its corresponding response (enquire_link_resp) may be performed by the intelligent routing engine 126 frequently and the results logged in the msg/bind event database 124.

The intelligent routing engine 126 may then determine the relative 'health' of each message route by examining the current and very recent bind events and message events associated with a message route. Based on a determination that the message route is experiencing poor deliverability characteristics, the intelligent routing engine 126 may amend the failure rate (FR) weight associated with the message route. This may be reflected the next time the linear constrained optimization model is run resulting in an amended integer weight for that message route.

Similarly, the successful use of a particular message route may cause the contractual commitment (CM) parameter to change during the relevant period. Each time such a message route is used, the percentage of messages contractually required to use that message route decreases slightly. This data may be used to adjust the constraints used by the linear constrained optimization model during its next iteration.

FIGS. 2-5 illustrate a set of logic flows. These logic flows may be representative of some or all of the operations executed by one or more logic, features, or devices described herein, such as any devices or systems described above with references to other figures herein. In the illustrated examples shown in FIGS. 2-5, the logic flows may comprise one or more steps or processes involved in routing messages as described elsewhere herein. The embodiments, however, are not limited to the number, type, order or arrangement of steps shown in FIGS. 2-5.

Figure 2:
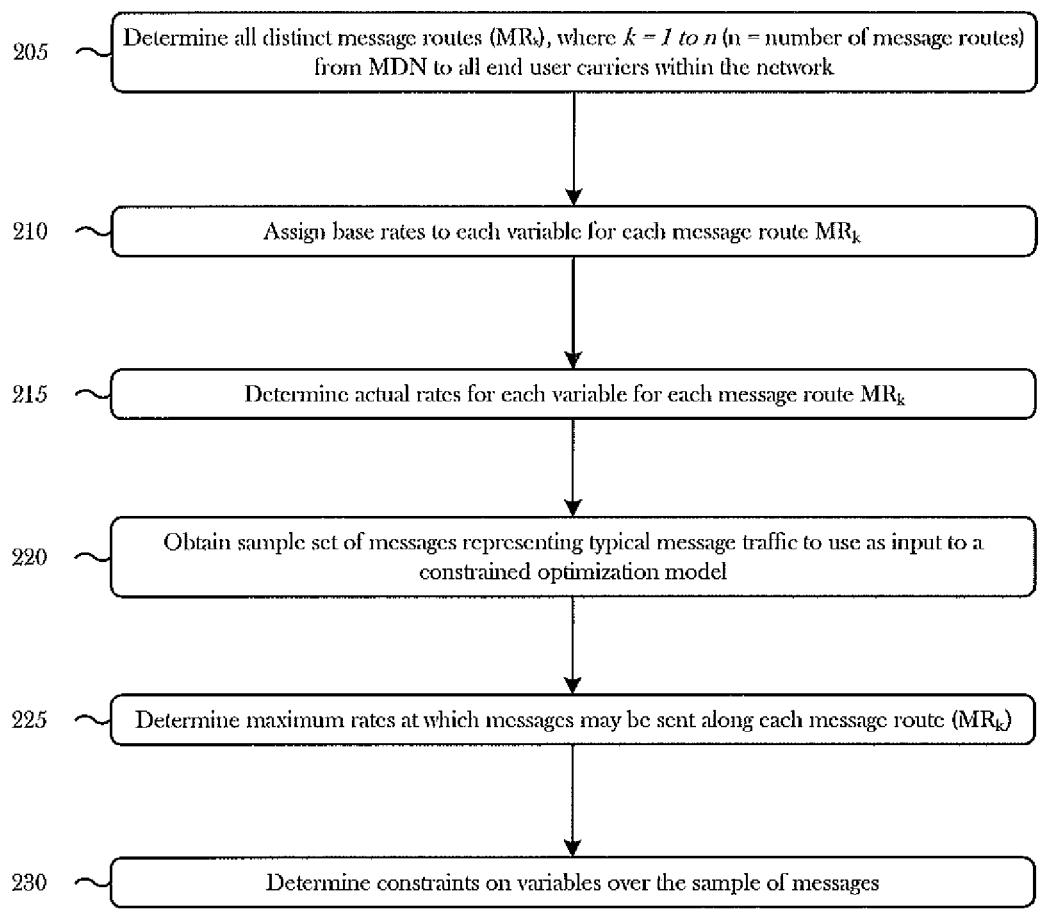
FIG. 2 illustrates a first logic flow diagram for setting up a linear constrained optimization model according to an embodiment.

FIG. 2 illustrates an example of a logic flow 200 directed toward setting up a linear constrained optimization model used to determine an optimized rank ordered list of message routes from the message delivery network 115 to an end user carrier 150 for a given message.

Process 200 may determine all possible message routes to all end user carriers 150 serviced by MDN 115 (block 205). For example, the intelligent routing engine 126 may determine and identify how many different binds or connections it may use to deliver a message to all end user carriers 150. The paths or message routes between MDN 115 and the end user carriers 150 may include one or more aggregators 140 as well as one or more receiving service providers 140. Each path may have different characteristics.

Process 200 may then assign base rates to each variable for each message route (block 210). For example, there may be two (2) primary variables that impact the selection of a message route—cost and failure rate. The base rates may represent an average acceptable rate for the given variable. In the case of cost, the base rate may be set to a cost acceptable to the economics of running the MDN 115 while the failure rate may be set to a value acceptable to a quality of service (QoS) metric desired by the MDN 115. The base rates also serve as a point of reference for comparing the rates associated with actual message routes.

Process 200 may then determine the actual rates for each variable for each message route (block 215). For instance, the use of each separate message route from the MDN 115 to a destination end user carrier 150 may be associated with its own defined rate or cost. This rate may fluctuate among disparate message routes even if they terminate with the same end user carrier 150. For instance, there may be several intermediary options for relaying a message to a particular destination served by an end user carrier 150. Each of these options may be associated with their own unique costs and failure rates. The choice to use a particular message route may be entrusted to intelligence built into the intelligent routing engine 126 in each data center 120 of MDN 115.

Process 200 may then obtain a sample set of messages representing typical message traffic to use as input to a linear constrained optimization model/simulation (block 220). The sample set size may be variable. For example, a set of 1000 messages may provide faster results but may not be exhaustive enough to provide a robust picture of the network. A set of 1,000,000 messages may provide robust results while not taxing the processing of the MDN 115.

Process 200 may then determine the maximum rates at which messages may be sent along each message route (block 225). This is an example of a constraint placed upon a message route. For example, a particular message route may be deemed highly favorable based on its cost and failure rate profile but may be constrained in the number of messages it can handle in a given time period (e.g., msgs/sec). If the maximum rate for a given message route were to be exceeded, it would result in a bounce back. If this message route were to be overused, its failure rate would increase based on the bounce back of messages delivery attempts.

Process 200 may then determine any additional constraints on variables to be implemented in running the linear constrained optimization model over the sample set of messages (block 230). The totality of variables and constraints create a somewhat complex system in which the choice to utilize a particular message route for a particular message has an associated cost and resultant effect on the next message with the goal of optimizing the utilization of the entire network for message delivery.

Figure 3:
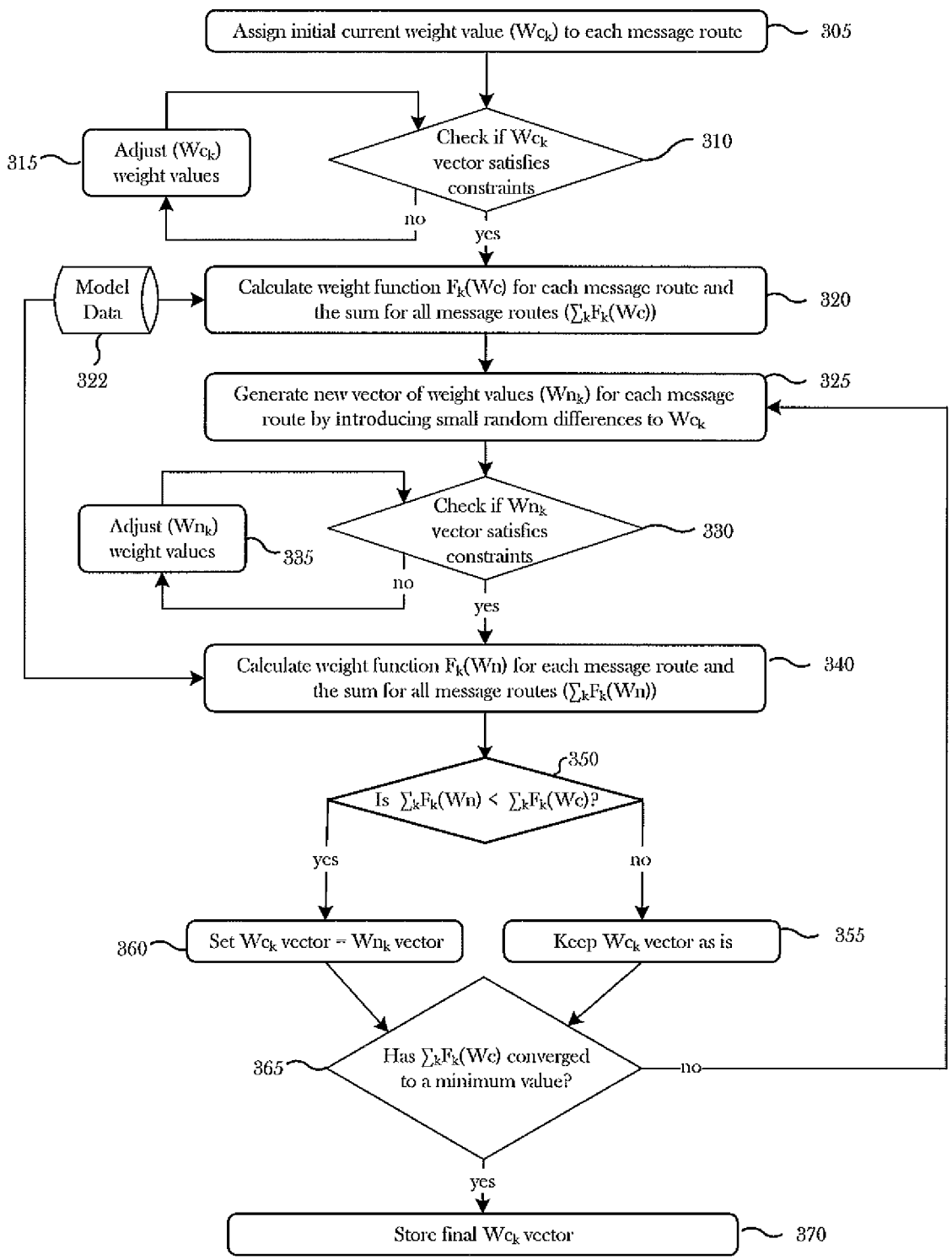
FIG. 3 illustrates a second logic flow diagram for solving a linear constrained optimization model according to an embodiment.

FIG. 3 illustrates an example of another logic flow 300 directed toward the solving of the linear constrained optimization model described in FIG. 2. The process of running a simulation based on the variables and constraints described in FIG. 2 may then be used to determine an optimal normalized weighting factor ($Wc_k$) for each message route from message delivery network 115 to an end user carrier 150. For the sake of illustration, the sum of all $Wc_k$ (i.e., $J_k Wc_k$)) has been normalized to 1,000,000.

Process 300 may include initially assigning a current normalized weighting factor ($Wc_k$) to each message route identified in block 205 of FIG. 2 (block 305). In this instance, 'k' is representative of a particular message route where 'k' ranges from 1 to 'n', 'n' being the total number of message routes serviceable by the MDN 115. For example, in an MDN 115 that can utilize a defined number of total message routes, one possibility could entail initially weighting every possible message route equally and allowing the linear constrained optimization model to converge upon a result comprising a final vector of weighting factors ($Wc_k$) for all message routes.

Process 300 may further include a check to determine whether the initially assigned vector of normalized weight values ($Wc_k$) for each message route satisfies the set of constraints placed upon the system (block 310). If not, process 300 may make small adjustments to the vector of $Wc_k$ weight values for the message routes (block 315) and test them again at block 310. This loop recurs until a vector of $Wc_k$ satisfies block 310. Once a vector of initial normalized $Wc_k$ has been obtained, a weight value $F_k(Wc)$ may be calculated for each message route followed by summing all weight values ($\Sigma_k F_k(Wc)$) to obtain the sum of all the message route weights (block 320). This may entail subjecting the linear constrained optimization model to a realistic set of test data (database 322). The test data may be previous messages sent by the MDN 115. These messages may be stripped of their content but maintain the metadata such as the destination carrier. A set of 1,000,000 messages may be used, for instance, as it provides enough data to sufficiently cover all message routes. In one embodiment, $F_k(Wc)$ may be calculated as:

$$F_k(Wc)=Wc_k*(wf_c(\text{actual cost}_k/\text{base cost})^2+wf_{fr}(\text{actual } FR_k/\text{base } FR)^2)$$

where, $Wc_k$ is an initial normalized message route weight for a given message route, $wf_c$ is a weighting factor for cost and $wf_{fr}$ is a weighting factor for failure rate, where $wf_c+wf_{fr}=1$ representing the extent to which the formula biases cost or failure rate. For instance, if $wf_c=0.7$ and $wf_{fr}=0.3$, then cost is being prioritized over failure rate to the extent that cost comprises 70% and failure rate comprises 30% of the overall message route weight value $F_k(Wc)$ for a given message route. The cost component, in this instance, may be calculated as the square of the ratio of actual $cost_k$ of the specified message route to the base cost. The failure rate (FR) component, in this instance, may be calculated as the square of the ratio of actual $FR_k$ of the specified message route to base FR. The sum of all message route weight calculations ($\Sigma_k F_k(Wc)$) yields a value based on the current (in this case the initial) message route weightings ($Wc_k$) for all message routes. When the actual $cost_k$ and actual failure $rate_k$ (FR) are less than their respective base values for a given message route, that message route is better than a hypothetical message route set to the base values. By putting the base values in the denominator for both cost and failure rate (FR), a lower value of $F_k(Wc)$ for a message route is better. Similarly, a lower $\Sigma_k F_k(Wc)$ for all message routes is better. The current value for $\Sigma_k F_k(Wc)$ as well as the current vector for $Wc_k$ are stored for later comparison.

Process 300 may further include generating a new vector of normalized message route weight values ($Wn_k$) by introducing small random differences to the current vector of normalized weight values ($Wc_k$) (block 325). Process 300 may then check to determine whether the new $Wn_k$ vector for each message route satisfy the set of one or more constraints placed upon the system (block 330). If not, process 300 may introduce small adjustments to the each message route weight value in the $Wn_k$ vector (block 335) and test them again at block 330. This loop recurs until a $Wn_k$ vector satisfies block 330. Once the new $Wn_k$ vector has been obtained, a new weight value $F_k(Wn)$ may be calculated for each message route followed by summing all new weight values ($\Sigma_k F_k(Wn)$) to obtain the new sum of all the message route weights (block 340).

Process 300 may then compare $\Sigma_k F_k(Wc)$ to $\Sigma_k F_k(Wn)$ to determine which vector ($Wc_k$) or ($Wn_k$) yielded better overall results when applied to the linear constrained optimization model (decision block 350). Whichever sum is lower is indicative of better overall system performance meaning the weights given to the message routes exhibited a more optimal interplay of overall costs and failure rates given the constraints. If $\Sigma_k F_k(Wc)<\Sigma_k F_k(Wn)$, then the $Wc_k$ and $\Sigma_k F_k(Wc)$ values will remain the current values (block

355). If $\Sigma_k F_k(Wc) > \Sigma_k F_k(Wn)$, then the $Wn_k$ and $\Sigma_k F_k(Wn)$ values will become the new current values (i.e., $Wc_k$ and $\Sigma_k F_k(Wc)$) (block 360).

Process 300 may then determine whether $\Sigma_k F_k(Wc)$ has converged on a minimum value (decision block 365). If not, control is returned to block 325 to determine a new vector of weight values $Wn_k$ again and continue the convergence process. If $\Sigma_k F_k(Wc)$ has converged on a minimum value, the linear constrained optimization model has completed and the current $Wc_k$ values are the final message route weight values to be used when determining a rank ordered list of message routes for a given message (block 370).

It should be noted that the linear constrained optimization model may be updated frequently such as, for instance, once per minute. Doing so keeps the model current by updating data affecting weighting variables. For instance, message route failure rates may fluctuate more dynamically in response to equipment failures, software failures, etc. Sometimes capacity may be affected or even the cost may get updated. Having current data makes the overall linear constrained optimization model more accurate.

FIG. 4 illustrates an example of another logic flow 400 directed toward the delivery of a message received into the message delivery network 115 and intended for an end user carrier 150. As shown in FIG. 4, in some aspects, process 400 may include receiving a message into a message delivery network 115 from a sending message service provider 110 (block 405). For example, the message may be received via a gateway 122 within a data center 120 of a message delivery network 115 from a sending message service provider 110 that originated from an end user 105 or an A2P customer.

Process 400 may further include identifying an end user carrier 150 servicing an intended recipient end user device 155 for the message (block 410). For example, the gateway 122 may identify an end user carrier 150 servicing the end user device 155 for the message, or the gateway may pass the message to an intelligent routing engine 126 and have the intelligent routing engine 126 identify the end user carrier 150.

Process 400 may further include randomly producing a rank ordered list of message routes capable of delivering the message from the message delivery network 115 to the end user carrier (block 415). This process is further described with reference to FIG. 5 below.

Process 400 may further include forwarding the message along with a rank ordered list of message routes to a gateway 122 within the message delivery network 115 (block 425). For example, the intelligent routing engine 126 may forward the message to the gateway 122 of a data center 120 within the message delivery network 115. The message may include the rank ordered list of message routes to be used when attempting to deliver the message.

Process 400 may further include attempting delivery of the message using the first message route from the rank ordered list (block 430). Process 400 may further include determining whether the delivery attempt was successful (decision block 435). For example, gateway 122 may or may not receive an expected delivery receipt acknowledgment. In addition, one or more other message events and/or bind events may be received in relation to the delivery attempt to indicate whether it was successful.

If this delivery attempt is unsuccessful, process 400 may then determine whether there are message routes still available on the rank ordered list that have not yet been tried (decision block 440). If there are no remaining untried message routes, process 400 may return an "undeliverable" message to the sending service provider to indicate that the message could not be delivered at this time (block 450). If there are message routes on the rank ordered list that have yet to be tried, process 400 may then attempt delivery of the message using the highest ranked remaining message route on the rank ordered list (block 445). Control then returns to decision block 435 to determine whether the message delivery attempt was successful. This process may then continue to repeat until the message is successfully delivered or there are no more message routes to try.

Process 400 may include additional aspects, such as any single aspect or any combination of aspects described below and/or in connection with one or more other processes described elsewhere herein.

FIG. 5 illustrates an example of another logic flow 500 directed toward producing a rank ordered list of message routes to be used by the message delivery network 115 when delivering a message to an end user carrier 150. As shown in FIG. 5, in some aspects, process 500 may include determining the destination end user carrier 150 for a message and eliminating all message routes that cannot deliver the message to the destination end user carrier 150 (block 505). For example, intelligent routing engine 126 may access the list of message routes usable by MDN 115. Those message routes that do not terminate at the same end user carrier 150 specified in the current message to be sent are eliminated from consideration.

Process 500 may further include a process for summing the individual normalized weight values ($Wc_k$) associated with each message route that terminates with the destination end user carrier 150 (block 510). The individual normalized weight values ($Wc_k$) were stored at block 370 and represent the final outcome of solving the linear constrained optimization model described in FIG. 3. Intelligent routing engine 126 may then sum only the individual normalized weight values ($Wc_k$) associated with message routes that terminate with the particular end user carrier 150 as the message presented for delivery.

Process 500 may then create a set of integers spanning the range of 1 to the sum of message route weights just determined (block 515). Each message route may then be assigned a subset of the integer set whose size is proportional to each message route's relative weighting (block 520). For instance, if there are three (3) message routes (e.g., $MR_1$, $MR_2$, $MR_3$) where the weighting value ($Wc_1$) for $MR_1$=23,000, $Wc_2$ for $MR_2$=53,000, and $Wc_3$ for $MR_3$=3,000, the sum would be 79,000. The integer set would span 1-79,000 where $MR_1$ would be assigned the subset of 1-23,000, $MR_2$ would be assigned the subset of 23,001-76,000, and $MR_3$ would be assigned the subset of 76,001-79,000.

Process 500 may then generate a random number within the set of integers spanning the range of 1 to the sum of message routes (block 525). In the example given, a random number between 1 and 79,000 may be generated. Process 500 may then determine the message route to which the generated random number corresponds (block 530). For example, if the random number generated were 37,498, it would correspond to $MR_2$ based on the assignments made in block 520.

Process 500 may then determine if the message route just determined through the random number generation process has been assigned in the rank ordered list (decision block 535). For example, in constructing the rank ordered list, each eligible message route must be entered. The order of entry may be based on the random number generation process just described. If the selected message route determined in decision block 535 has already been assigned, control is returned to block 525 where another random number is generated. Otherwise, when the selected message route determined in decision block 535 has not yet been assigned, it will automatically be given the highest remaining ranking (block 540). Process 500 may then determine if more than one message route is still available to be assigned a ranking in the rank ordered list (decision block 545). If there are multiple message routes still to be assigned, control is returned to block 525 where another random number is generated and the process repeats. Eventually, there will be only a single remaining message route to be assigned. This will be determined by decision block 545 leading to assigning that sole remaining message route to the last spot on the rank ordered last (block 550). Process 500 may then produce a final rank ordered list of message routes (block 555) to be associated with the message to be delivered in block 420 of FIG. 4.

The random number generation process is used to ensure that the same rank ordered list is not necessarily produced for each message presented for delivery. While it is true the message routes are not equal, utilizing the same "best" route is not optimal either as it will likely violate the constraints placed upon the system. In the example above involving three (3) message routes where $MR_1$ was assigned the subset of 1-23,000, $MR_2$ was assigned the subset of 23,001-76,000, and $MR_3$ was assigned the subset of 76,001-79,000, $MR_1$ would have a 26% chance of having a random number generated from its subset while $MR_2$ would have a 710% chance, and $MR_3$ would have a 4% chance. The most probable outcome of a rank ordered list would be ($MR_2$, $MR_1$, $MR_3$). However, due to the randomness of the process, it is conceivable that the rank ordered list could be ($MR_1$, $MR_2$, $MR_3$). Because of the relative weightings, as more messages are presented for delivery, the makeup of each rank ordered list should converge to the proportions of the individual message route weightings. Put another way, $MR_3$ should be selected as the highest ranked route approximately 4% of the time.

FIGS. 6A-6D and FIG. 7 illustrate example data output by the linear constrained optimization model to be used in determining a list of rank ordered message routes for a given message presented for delivery.

FIG. 6A illustrates results from the initial iteration of the linear constrained optimization model comprising relevant data for each message route 602a that can be utilized by MDN 115. It should be noted that the data shown in FIGS. 6A-6D and FIG. 7 is exemplary and illustrative and does not reflect any actual message data. In this example, there are twenty (20) total message routes in column 602a. The message routes service a total of four (4) end user or destination carriers that are identified in column 614a. It is noted that the same route may serve multiple destination carriers as the route terminates at the receiving service provider or aggregator 140 from the perspective of the MDN 115. As previously described, each message route is given an initial message route weight ($Wc_k$) as illustrated in column 604a. It should be noted that the initial message route weights ($Wc_k$) have been normalized to 1,000,000 meaning that the sum of $Wc_k$ for all message routes (i.e., $\Sigma_k Wc$) will always equal 1,000,000 (620). In addition, $\Sigma_k Wc$ is normalized back to the chosen number (e.g., 1,000,000) following each iteration of the process. A number other than 1,000,000 may be chosen without departing from the spirit or scope of the present description. Further, in this example, the initial message route weights ($Wc_k$) have been equally weighted to 50,000. The initial weights do not have to be equally weighted, however.

Column 606a expresses the base cost for delivering a message to the end user or destination carrier. The base cost, in this example, may be $1/10^{th}$ of a penny (i.e., 10×$0.0001=$0.001). The base cost is the same for all message routes as it represents a system wide value chosen to reflect a value that has meaning to the economics of delivering a message. For instance, it could estimate the breakeven point where actual costs below the base cost are profitable while actual costs above the base cost are not profitable.

Column 608a expresses the actual cost for delivering a message to the end user or destination carrier using a specific message route. The actual cost may vary substantially from message route to message route. The lower the actual cost of a particular message route compared to the base cost, the more profitable the message route.

Column 610a expresses the base failure rate associated with a message route. The base failure rate, in this example, may be 50 messages per 1000 delivered (i.e., 5%). The base failure is the same for all message routes as it represents a system wide value chosen to reflect a value that has meaning to the economics of delivering a message. For instance, it could estimate the point where actual failure rates above the base failure rates are intolerable which may be a constraint placed upon the model.

Column 612a expresses the actual failure rate associated with a message route. The actual failure rate, in this example, may be expressed as 'x' messages per 1000 delivered. The actual failure may fluctuate dramatically among message routes.

Column 616a represents a message weight function calculation ($F_k(Wc)$) that is indicative of a message route's relative ranking versus other message routes. $F_k(Wc)$ may be calculated in any number of ways to determine the optimal weighting for a given message route. System designers may bias certain variables over others. Variables may be treated in a linear relationship or an exponential relationship. The possibilities are virtually limitless. In the present example, however, $F_k(Wc)$ may be calculated as:

$$F_k(Wc)=Wc_k*(wf_c(\text{actual cost}_k/\text{base cost})^2+wf_{fr}(\text{actual } FR_k/\text{base } FR)^2)$$

where, $Wc_k$ is the normalized message route weight, $wf_c$ is a weighting factor for cost and $wf_{fr}$ is a weighting factor for failure rate, where $wf_c+wf_{fr}=1$ representing the extent to which the formula biases cost or failure rate. For instance, if $wf_c=0.7$ and $wf_{fr}=0.3$, then cost is being prioritized over failure rate to the extent that cost comprises 70% and failure rate comprises 30% of the overall message route weight value $F_k(Wc)$ for a given message route 630. The cost component, in this instance, may be calculated as the square of the ratio of actual $cost_k$ of the specified message route to the base cost. The failure rate (FR) component, in this instance, may be calculated as the square of the ratio of actual $FR_k$ of the specified message route to base FR.

The sum of all message route weight calculations ($\Sigma_k F_k(Wc)$) in column 616a yields a value 625 based on the current (in this case the initial) message route weightings ($Wc_k$) for all message routes. When the actual $cost_k$ and actual failure $rate_k$ (FR) are less than their respective base values for a given message route, that message route is better than a hypothetical message route set to the base values. By putting the base values in the denominator for both cost and failure rate (FR), a lower value of $F_k(Wc)$ for a message route is better. Thus, in the present example, message route 1 has the lowest $F_k(Wc)$ of 12.71 making it the most optimal route to use. Similarly, a lower $\Sigma_k F_k(Wc)$ for all message routes is better system-wide. For this initial set of data, $\Sigma_k F_k(Wc)$=784.15. This sum becomes the baseline for future iterations of the model as shown in FIGS. 6B-6D.

FIG. 6B illustrates results from the second iteration of the linear constrained optimization model comprising relevant data for each message route 602b that can be utilized by MDN 115. The second iteration is slightly and randomly different from the initial iteration in that small random adjustments have been introduced to the normalized current message route weights ($Wc_k$) for each message route. Thus, column 604b exhibits small random changes from what it was in 604a, where the changes impact the $F_k(Wc)$ calculation for each message route described above and detailed in column 616b. In this iteration, $\Sigma_k F_k(Wc)$=774.72 which is lower than the 784.15 in FIG. 6A meaning the overall performance of the system slightly improved in this iteration.

FIG. 6C illustrates results from the third iteration of the linear constrained optimization model comprising relevant data for each message route 602c that can be utilized by MDN 115. The third iteration is slightly and randomly different from the second iteration in that small random adjustments have been introduced to the normalized current message route weights ($Wc_k$) for each message route. Thus, column 604c exhibits small random changes from what it was in 604b, where the changes impact the $F_k(Wc)$ calculation for each message route described above and detailed in column 616c. In this iteration, $\Sigma_k F_k(Wc)$=770.48 which is lower than the 774.72 in FIG. 6B meaning the overall performance of the system slightly improved in this iteration.

FIG. 6D illustrates results from the final iteration of the linear constrained optimization model comprising relevant data for each message route 602d that can be utilized by MDN 115. The final iteration is slightly and randomly different from the previous iteration in that small random adjustments have been introduced to the normalized current message route weights ($Wc_k$) for each message route. This last iteration in FIG. 6D comes after the iteration in FIG. 6C. In actuality, there may have been thousands of iterations between FIGS. 6C and 6D leading to this final iteration that converged on a minimum value for the $\Sigma_k F_k(Wc)$. For the sake of illustration, only four iterations have been shown. Thus, column 604d exhibits changes from what it was in 604c, where the changes impact the $F_k(Wc)$ calculation for each message route described above and detailed in column 616d. In this iteration, $\Sigma_k F_k(Wc)$=531.19 which is lower than the 770.48 in FIG. 6C meaning the overall performance of the system improved in this iteration. Moreover, as this has been deemed the final iteration, it may be assumed that the $\Sigma_k F_k(Wc)$ has converged on a minimum value according to decision block 365 of FIG. 3.

FIG. 7 illustrates the output of the linear constrained optimization model where the results are reflected in final normalized message route weightings 706 which are the same as the normalized message route weightings shown in column 604d of FIG. 6D. Column 702 identifies the message route, column 704 identifies the destination carrier, and column 708 is a message route ranking within the destination carrier grouping only.

For example, the output of the linear constrained optimization model is a set of normalized integer weighting values each corresponding to a different message route. The range or scale for the integer weighting value of a message route is somewhat arbitrary meaning it can be a number between 1-1000, 1-1,000,000, or any other range. In this disclosure, a higher integer weighting value is indicative of a more favorable message route in relation to the integer weighting values of other message routes. The linear constrained optimization model will generate integer weighting values for all possible message routes but typically only a subset of message routes may be usable for a given message.

By way of example, suppose there are twenty (20) total message routes but for the current message, only five (5) of those message routes are viable to reach the specified end user carrier 150 (e.g., carrier A). The message routes may be identified as $MR_i$ where i ranges from 1-20. In our example, the five (5) viable message routes may be $MR_1$, $MR_2$, $MR_3$, $MR_4$, and $MR_5$. Each of these message routes is associated with an integer weighting value between 1 and 1,000,000 according to the table below:

| Route | Integer Weighting Value |
| --- | --- |
| $MR_1$ | 120,000 |
| $MR_2$ | 50,000 |
| $MR_3$ | 4,000 |
| $MR_4$ | 20,000 |
| $MR_5$ | 82,000 |
| $MR_6$ | 80,000 |
| $MR_7$ | 42,000 |
| $MR_8$ | 2,000 |
| $MR_9$ | 12,000 |
| $MR_{10}$ | 111,000 |
| $MR_{11}$ | 22,0000 |
| $MR_{12}$ | 45,000 |
| $MR_{13}$ | 63,000 |
| $MR_{14}$ | 87,000 |
| $MR_{15}$ | 2,000 |
| $MR_{16}$ | 4,000 |
| $MR_{17}$ | 24,000 |
| $MR_{18}$ | 71,000 |
| $MR_{19}$ | 105,000 |
| $MR_{20}$ | 54,000 |

The sum of the integer weighting values of the viable routes is 120,000+50,000+4,000+20,000+82,000=276,000. Each viable message route is then assigned a range from 1-276,000 as shown below:

| Route | Random Number Range |
| --- | --- |
| $MR_1$ | 120,000 |
| $MR_2$ | 50,000 |
| $MR_3$ | 4,000 |
| $MR_4$ | 20,000 |
| $MR_5$ | 82,000 |

Based on the relative weightings, $MR_1$ would be the top route approximately 43% of the time, $MR_2$ would be the top route approximately 18% of the time, $MR_3$ would be the top route approximately 1% of the time, $MR_4$ would be the top route approximately 7% of the time, and $MR_5$ would be the top route approximately 30% of the time.

Figure 8:
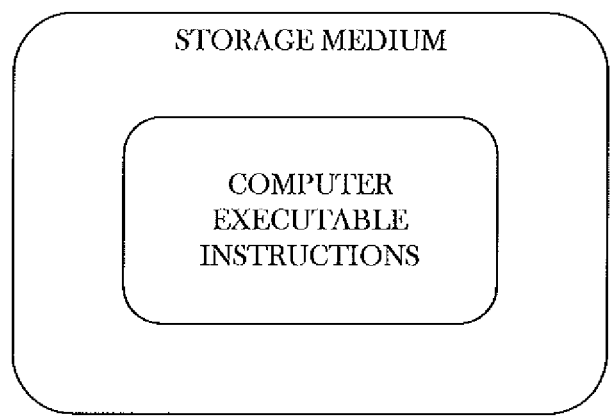
FIG. 8 illustrates an example of a storage medium.

FIG. 8 illustrates an embodiment of a first storage medium. As shown in FIG. 8, the first storage medium includes a storage medium 800. Storage medium 800 may comprise an article of manufacture. In some examples, storage medium 800 may include any non-transitory computer readable medium or machine-readable medium, such as an optical, magnetic or semiconductor storage. Storage medium 800 may store various types of computer executable instructions, such as instructions to implement one or more of logic flows as described above. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, assembly code, machine code, and the like. The examples are not limited in this context.

Figure 9:
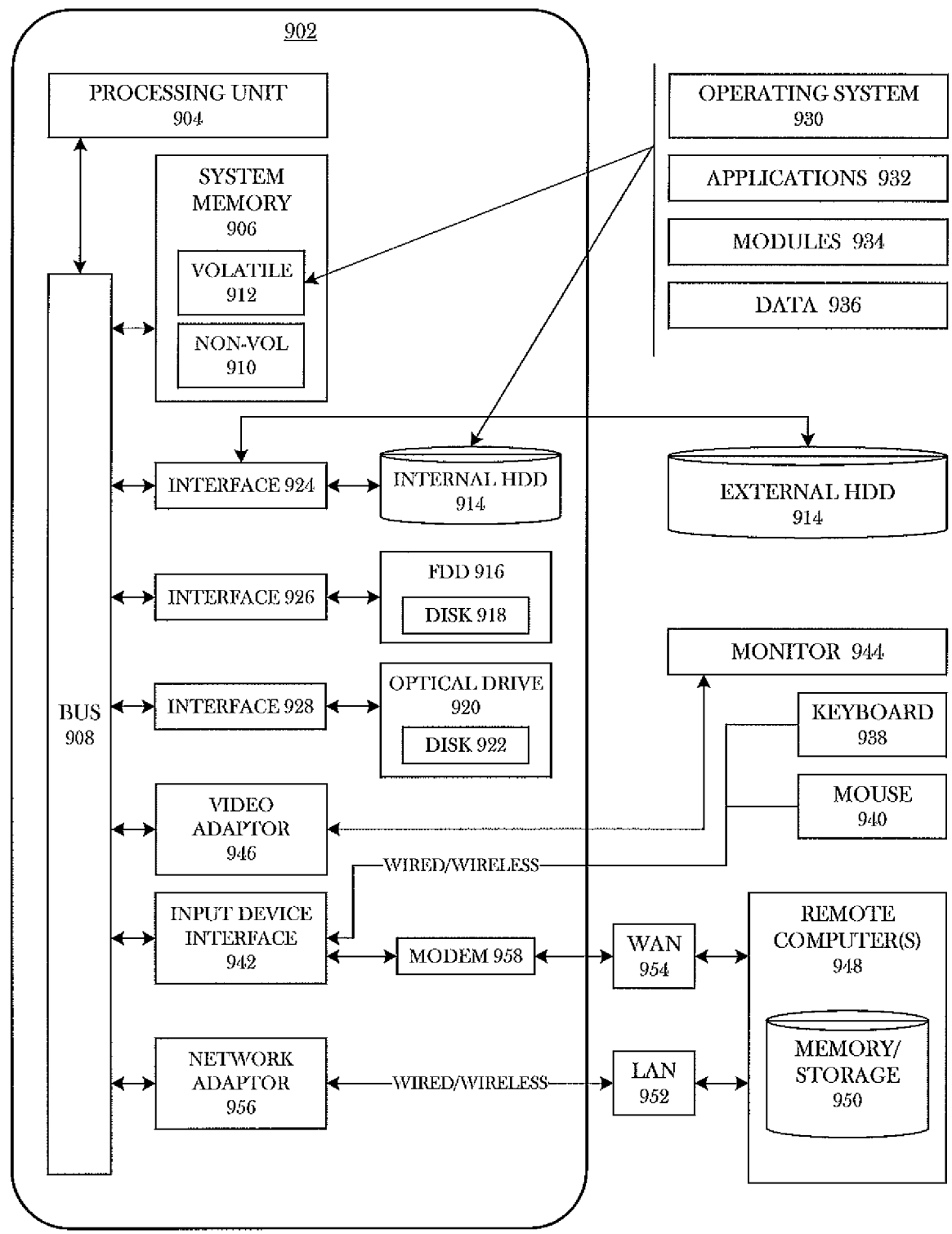
FIG. 9 illustrates an example of a computer device.

FIG. 9 illustrates an embodiment of an exemplary computing architecture 900 suitable for implementing various embodiments as previously described. In one embodiment, the computing architecture 900 may comprise or be implemented as part of an electronic device. The embodiments are not limited in this context.

As used in this application, the terms "system", "module", and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the system.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet. When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

In the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims may reflect, inventive subject matter may lie in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The invention claimed is:

1. A method of routing messages from a message delivery network (MDN) to one of a plurality of end user carriers, wherein there are a plurality of message routes capable of servicing each end user carrier, the method comprising:
   receiving a message into the MDN from a sending message service provider;
   identifying a destination end user carrier to which to deliver the message;
   producing a rank ordered list of message routes from the message delivery network to the destination end user carrier by solving a linear constrained optimization model configured to converge upon an optimized ranking of message routes from the MDN to the plurality of end user carriers;
attaching the rank ordered list of message routes to the message;
forwarding the message to a gateway within the MDN; and
initially delivering the message using the highest ranked message route from the rank ordered list of message routes.

2. The method of claim 1, further comprising:
determining whether the message delivery was successful based on an acknowledgment notification returned to the MDN;
when the message delivery was not successful, determining whether all the message routes on the rank ordered list have been attempted;
when all the message routes on the rank ordered list have not been attempted, attempting delivery of the message using the next highest ranked message route; and
when all the message routes on the rank ordered list have been attempted, returning an undeliverable message notification to the sending message service provider.

3. The method of claim 1, wherein creating the linear constrained optimization model comprises:
determining all possible message routes from the MDN to the end user carriers, where there are 'n' message routes with each message route indexed by 'k' where k=1 to n;
assigning a base cost indicative of a threshold cost for delivering a message to the plurality of end user carriers over any given message route;
assigning a base failure rate (FR) indicative of a threshold FR for any given message route;
determining an actual cost to use each message route;
determining an actual FR associated with each message route;
defining one or more constraints applicable to delivery of messages by the MDN;
determining a message route weight function ($F_k(Wc)$) based on a message route weight ($Wc_k$), the base cost, base FR, actual $cost_k$, actual failure $rate_k$, and the one or more constraints; and
obtaining a sample set of message data on which to solve the linear constrained optimization model.

4. The method of claim 3, the solving of the linear constrained optimization model comprising:
(a) assigning an initial normalized message route weight ($Wc_k$) to each message route to create a message route weight vector;
(b) determining whether the $Wc_k$ vector satisfies the one or more constraints;
(c) if the initial $Wc_k$ vector does not satisfy the one or more constraints, making small random adjustments to each $Wc_k$ until the $Wc_k$ vector does satisfy the one or more constraints;
(d) determining the value of $F_k(Wc)$ for each message route using the sample set of message data;
(e) calculating the sum of all the $F_k(Wc)$ values yielding $\Sigma_k F_k(Wc)$;
(f) making small random adjustments to each $Wc_k$ to yield a new $Wn_k$ vector;
(g) determining whether the $Wn_k$ vector satisfies the one or more constraints;
(h) if the $Wn_k$ vector does not satisfy the one or more constraints, making small random adjustments to each $Wn_k$ until the $Wn_k$ vector does satisfy the one or more constraints;
(i) determining the value of each new message route weight function $F_k(Wn)$ for each message route using the sample set of message data;
(j) calculating the sum of all the $F_k(Wn)$ values to yield $\Sigma_k F_k(Wn)$;
(k) determining if $\Sigma_k F_k(Wn)$ is less than $\Sigma_k F_k(Wc)$;
(l) when $Y_k F_k(Wn)$ is less than $\Sigma_k F_k(Wc)$, setting $Wc_k = Wn_k$ and $\Sigma_k F_k(Wc) = \Sigma_k F_k(Wn)$, otherwise leaving $Wc_k$ and $\Sigma_k F_k(Wc)$ unchanged;
(m) determining whether $\Sigma_k F_k(Wc)$ has converged to a minimum value;
(n) when $\Sigma_k F_k(Wc)$ has converged to a minimum value, storing the $Wc_k$ vector as the final message route weight vector, otherwise repeating steps (f)-(n).

5. The method of claim 4, the producing a rank ordered list of message routes from the message delivery network to the destination end user carrier comprising:
(a) retrieving the stored $Wc_k$ vector;
(b) eliminating message routes that cannot deliver the message to the destination end user carrier;
(c) summing the remaining $Wc_k$ for message routes that can terminate at the destination end user carrier yielding $\Sigma_k Wc_k$;
(d) creating a first set comprised of 1 to $\Sigma_k Wc_k$ of message route weights for message routes that can terminate at the destination end user carrier;
(e) assigning each remaining message route that can terminate at the destination end user carrier to a portion of the first set, the portion being proportional to each message route's weight ($Wc_k/\Sigma_k Wc_k$);
(f) generating a random number from the first set;
(g) determining which message route has been assigned to the generated random number;
(h) determining if the message route associated with the generated random number has already been assigned within the rank ordered list;
(i) when the message route associated with the generated random number has already been assigned within the rank ordered list, repeating steps (f)-(i), otherwise;
(j) assigning the message route associated with the generated random number to the highest remaining priority in the rank ordered list;
(k) determining whether more than one message route remains unassigned in the rank ordered list;
(l) when more than one message route remains unassigned in the rank ordered list, repeating steps (f)-(l), otherwise;
(m) assigning the last remaining message route to the last spot in the rank ordered list; and
(n) producing the rank ordered list of message routes from the message delivery network to the destination end user carrier for the message to be delivered.

6. The method of claim 5, wherein $F_k(Wc) = (\text{cost component})_k + (\text{FR component})_k$.

7. The method of claim 6, wherein the cost component is based on a ratio between the actual $cost_k$ and base cost and the FR component is based on a ratio between the actual $FR_k$ and base FR.

8. The method of claim 7, wherein a cost weighting factor ($wf_c$) between 0 and 1 is applied to the cost component of $F_k(Wc)$ and a FR weighting factor ($wf_{fr}$) between 0 and 1 is applied to the FR component of $F_k(Wc)$, wherein $wf_c + wf_{fr} = 1$.

9. The method of claim 1, the message comprising a short message service (SMS) message.

10. The method of claim 1, the message comprising a multi-media message service (MMS) message.

11. A message delivery network (MDN), comprising:
one or more memories; and
one or more processors communicatively coupled to the one or more memories for routing messages from the MDN to one of a plurality of end user carriers, wherein there are a plurality of message routes capable of servicing each end user carrier, the one or more processors configured to:
  receive a message into the MDN from a sending message service provider;
identify a destination end user carrier to which to deliver the message;
  produce a rank ordered list of message routes from the message delivery network to the destination end user carrier by solving a linear constrained optimization model configured to converge upon an optimized ranking of message routes from the MDN to the plurality of end user carriers;
  attach the rank ordered list of message routes to the message;
  forward the message to a gateway within the MDN; and
  initially deliver the message using the highest ranked message route from the rank ordered list of message routes.

12. The MDN of claim 11, wherein the one or more processors are further configured to:
  determine whether the message delivery was successful based on an acknowledgment notification returned to the MDN;
  when the message delivery was not successful, determine whether all the message routes on the rank ordered list have been attempted;
  when all the message routes on the rank ordered list have not been attempted, attempt delivery of the message using the next highest ranked message route; and
  when all the message routes on the rank ordered list have been attempted, return an undeliverable message notification to the sending message service provider.

13. The MDN of claim 11, wherein to create the linear constrained optimization model the one or more processors are further configured to:
  determine all possible message routes from the MDN to the end user carriers, where there are 'n' message routes with each message route indexed by 'k' where k=1 to n;
  assign a base cost indicative of a threshold cost for delivering a message to the plurality of end user carriers over any given message route;
  assign a base failure rate (FR) indicative of a threshold FR for any given message route;
  determine an actual cost to use each message route;
  determine an actual FR associated with each message route;
  define one or more constraints applicable to delivery of messages by the MDN;
  determine a message route weight function ($F_k(Wc)$) based on a message route weight ($Wc_k$), the base cost, base FR, actual $cost_k$, actual failure $rate_k$, and the one or more constraints; and
  obtain a sample set of message data on which to solve the linear constrained optimization model.

14. The MDN of claim 11, wherein to solve the linear constrained optimization model the one or more processors are further configured to:
  (a) assign an initial normalized message route weight ($Wc_k$) to each message route to create a message route weight vector;
  (b) determine whether the $Wc_k$ vector satisfies the one or more constraints;
  (c) if the initial $Wc_k$ vector does not satisfy the one or more constraints, make small random adjustments to each $Wc_k$ until the $Wc_k$ vector does satisfy the one or more constraints;
  (d) determine the value of $F_k(Wc)$ for each message route using the sample set of message data;
  (e) calculate the sum of all the $F_k(Wc)$ values yielding $\Sigma_k F_k(Wc)$;
  (f) make small random adjustments to each $Wc_k$ to yield a new $Wn_k$ vector;
  (g) determine whether the $Wn_k$ vector satisfies the one or more constraints;
  (h) if the $Wn_k$ vector does not satisfy the one or more constraints, make small random adjustments to each $Wn_k$ until the $Wn_k$ vector does satisfy the one or more constraints;
  (i) determine the value of each new message route weight function $F_k(Wn)$ for each message route using the sample set of message data;
  (j) calculate the sum of all the $F_k(Wn)$ values to yield $\Sigma_k F_k(Wn)$;
  (k) determine if $\Sigma_k F_k(Wn)$ is less than $\Sigma_k F_k(Wc)$;
  (l) when $\Sigma_k F_k(Wn)$ is less than $\Sigma_k F_k(Wc)$, set $Wc_k=Wn_k$ and $\Sigma_k F_k(Wc)=\Sigma_k F_k(Wn)$, otherwise leave $Wc_k$ and $\Sigma_k F_k(Wc)$ unchanged;
  (m) determine whether $\Sigma_k F_k(Wc)$ has converged to a minimum value;
  (n) when $\Sigma_k F_k(Wc)$ has converged to a minimum value, store the $Wc_k$ vector as the final message route weight vector, otherwise repeating steps (f)-(n).

15. The MDN of claim 14, wherein to produce a rank ordered list of message routes from the message delivery network to the destination end user carrier the one or more processors are further configured to:
  (a) retrieve the stored $Wc_k$ vector;
  (b) eliminate message routes that cannot deliver the message to the destination end user carrier;
  (c) sum the remaining $Wc_k$ for message routes that can terminate at the destination end user carrier yielding $\Sigma_k Wc_k$;
  (d) create a first set comprised of 1 to $\Sigma_k Wc_k$ of message route weights for message routes that can terminate at the destination end user carrier;
  (e) assign each remaining message route that can terminate at the destination end user carrier to a portion of the first set, the portion being proportional to each message route's weight ($Wc_k/\Sigma_k Wc_k$);
  (f) generate a random number from the first set;
  (g) determine which message route has been assigned to the generated random number;
  (h) determine if the message route associated with the generated random number has already been assigned within the rank ordered list;
  (i) when the message route associated with the generated random number has already been assigned within the rank ordered list, repeat steps (f)-(i), otherwise;
  (j) assign the message route associated with the generated random number to the highest remaining priority in the rank ordered list;

(k) determine whether more than one message route remains unassigned in the rank ordered list;

(l) when more than one message route remains unassigned in the rank ordered list, repeat steps (f)-(l), otherwise;

(m) assign the last remaining message route to the last spot in the rank ordered list; and (n) produce the rank ordered list of message routes from the message delivery network to the destination end user carrier for the message to be delivered.

16. The MDN of claim 15, wherein $F_k(Wc)$=(cost component)$_k$+(FR component)$_k$.

17. The MDN of claim 16, wherein the cost component is based on a ratio between the actual cost$_k$ and base cost and the FR component is based on a ratio between the actual FR$_k$ and base FR.

18. The MDN of claim 17, wherein a cost weighting factor ($wf_c$) between 0 and 1 is applied to the cost component of $F_k(Wc)$ and a FR weighting factor ($wf_{fr}$) between 0 and 1 is applied to the FR component of $F_k(Wc)$, wherein $wf_c+wf_{fr}=1$.

19. The MDN of claim 11, the message comprising a short message service (SMS) message.

20. The MDN of claim 11, the message comprising a multi-media message service (MMS) message.

21. A non-transitory computer-readable medium storing instructions for routing messages from a message delivery network (MDN) to one of a plurality of end user carriers wherein there are a plurality of message routes capable of servicing each end user carrier, the instructions comprising one or more instructions that, when executed by one or more processors, cause the one or more processors to:

receive a message into the MDN from a sending message service provider;

identify a destination end user carrier to which to deliver the message;

produce a rank ordered list of message routes from the message delivery network to the destination end user carrier by solving a linear constrained optimization model configured to converge upon an optimized ranking of message routes from the MDN to the plurality of end user carriers;

attach the rank ordered list of message routes to the message;

forward the message to a gateway within the MDN; and initially deliver the message using the highest ranked message route from the rank ordered list of message routes.

22. The non-transitory computer-readable medium of claim 21, wherein the one or more instructions, when executed by the one or more processors, further cause the one or more processors to:

determine whether the message delivery was successful based on an acknowledgment notification returned to the MDN;

when the message delivery was not successful, determine whether all the message routes on the rank ordered list have been attempted;

when all the message routes on the rank ordered list have not been attempted, attempt delivery of the message using the next highest ranked message route; and when all the message routes on the rank ordered list have been attempted, return an undeliverable message notification to the sending message service provider.

23. The non-transitory computer-readable medium of claim 21, wherein to create the linear constrained optimization model the one or more instructions, when executed by the one or more processors, further cause the one or more processors to:

determine all possible message routes from the MDN to the end user carriers, where there are 'n' message routes with each message route indexed by 'k' where k=1 to n;

assign a base cost indicative of a threshold cost for delivering a message to the plurality of end user carriers over any given message route;

assign a base failure rate (FR) indicative of a threshold FR for any given message route;

determine an actual cost to use each message route;

determine an actual FR associated with each message route;

define one or more constraints applicable to delivery of messages by the MDN;

determine a message route weight function ($F_k(Wc)$) based on a message route weight ($Wc_k$), the base cost, base FR, actual cost$_k$, actual failure rate$_k$, and the one or more constraints; and obtain a sample set of message data on which to solve the linear constrained optimization model.

24. The non-transitory computer-readable medium of claim 21, wherein to solve the linear constrained optimization model the one or more instructions, when executed by the one or more processors, further cause the one or more processors to:

(a) assign an initial normalized message route weight ($Wc_k$) to each message route to create a message route weight vector;

(b) determine whether the $Wc_k$ vector satisfies the one or more constraints;

(c) if the initial $Wc_k$ vector does not satisfy the one or more constraints, make small random adjustments to each $Wc_k$ until the $Wc_k$ vector does satisfy the one or more constraints;

(d) determine the value of $F_k(Wc)$ for each message route using the sample set of message data;

(e) calculate the sum of all the $F_k(Wc)$ values yielding $\Sigma_k F_k(Wc)$;

(f) make small random adjustments to each $Wc_k$ to yield a new $Wn_k$ vector;

(g) determine whether the $Wn_k$ vector satisfies the one or more constraints;

(h) if the $Wn_k$ vector does not satisfy the one or more constraints, make small random adjustments to each $Wn_k$ until the $Wn_k$ vector does satisfy the one or more constraints;

(i) determine the value of each new message route weight function $F_k(Wn)$ for each message route using the sample set of message data;

(j) calculate the sum of all the $F_k(Wn)$ values to yield $\Sigma_k F_k(Wn)$;

(k) determine if $\Sigma_k F_k(Wn)$ is less than $\Sigma_k F_k(Wc)$;

(l) when $\Sigma_k F_k(Wn)$ is less than $\Sigma_k F_k(Wc)$, set $Wc_k=Wn_k$ and $\Sigma_k F_k(Wc)=\Sigma_k F_k(Wn)$, otherwise leave $Wc_k$ and $\Sigma_k F_k(Wc)$ unchanged;

(m) determine whether $\Sigma_k F_k(Wc)$ has converged to a minimum value;

(n) when $\Sigma_k F_k(Wc)$ has converged to a minimum value, store the $Wc_k$ vector as the final message route weight vector, otherwise repeating steps (f)-(n).

25. The non-transitory computer-readable medium of claim 24, wherein to produce a rank ordered list of message routes from the message delivery network to the destination end user carrier the one or more instructions, when executed by the one or more processors, further cause the one or more processors to:

(a) retrieve the stored $Wc_k$ vector;
(b) eliminate message routes that cannot deliver the message to the destination end user carrier;
(c) sum the remaining $Wc_k$ for message routes that can terminate at the destination end user carrier yielding $\Sigma_k Wc_k$;
(d) create a first set comprised of 1 to $\Sigma_k Wc_k$ of message route weights for message routes that can terminate at the destination end user carrier;
(e) assign each remaining message route that can terminate at the destination end user carrier to a portion of the first set, the portion being proportional to each message route's weight ($Wc_k/\Sigma_k Wc_k$);
(f) generate a random number from the first set;
(g) determine which message route has been assigned to the generated random number;
(h) determine if the message route associated with the generated random number has already been assigned within the rank ordered list;
(i) when the message route associated with the generated random number has already been assigned within the rank ordered list, repeat steps (f)-(i), otherwise;
(j) assign the message route associated with the generated random number to the highest remaining priority in the rank ordered list;
(k) determine whether more than one message route remains unassigned in the rank ordered list;
(l) when more than one message route remains unassigned in the rank ordered list, repeat steps (f)-(l), otherwise;
(m) assign the last remaining message route to the last spot in the rank ordered list; and
(n) produce the rank ordered list of message routes from the message delivery network to the destination end user carrier for the message to be delivered.

26. The non-transitory computer-readable medium of claim 25, wherein $F_k(Wc)=(\text{cost component})_k+(\text{FR component})_k$.

27. The non-transitory computer-readable medium of claim 26, wherein the cost component is based on a ratio between the actual $\text{cost}_k$ and base cost and the FR component is based on a ratio between the actual $FR_k$ and base FR.

28. The non-transitory computer-readable medium of claim 27, wherein a cost weighting factor ($wf_c$) between 0 and 1 is applied to the cost component of $F_k(Wc)$ and a FR weighting factor ($wf_{fr}$) between 0 and 1 is applied to the FR component of $F_k(Wc)$, wherein $wf_c+wf_{fr}=1$.

29. The non-transitory computer-readable medium of claim 21, the message comprising a short message service (SMS) message.

30. The non-transitory computer-readable medium of claim 21, the message comprising a multi-media message service (MMS) message.

* * * * *